2,863,810

PROCESS FOR ELECTROWINNING ZINC

John J. Henderson and Harry L. Montague, Corpus Christi, Tex., assignors to American Smelting and Refining Company, New York, N. Y., a corporation of New Jersey No Drawing. Application March 26, 1957
Serial No. 648,490

4 Claims. (Cl. 204—119)

This invention relates to the electrolytic winning of zinc from zinc sulfate solutions, using insoluble anodes comprised of lead. More particularly, it relates to a novel procedure for conducting the electrowinning process with anodes of this type, and especially with the new anodes which are required from time to time to replace those which become worn-out in an established electrolytic plant or with the new electrodes for starting a new plant.

In the electrowinning of zinc, every effort is made in the art to reduce to a minimum the deleterious impurities contained in the cathodically deposited zinc. In particular, such efforts are directed to reducing the lead content of the cathodic zinc and the art is constantly seeking method and means to control the lead contamination in the zinc deposited at the cathode.

Generally, in practice, electrowinning of zinc is conducted in comparatively large plants on a continuous basis using a zinc electrolyte in which the major non-aqueous constituents are substantial quantities of zinc sulfate and sulfuric acid. The electrolyte is obtained by leaching a zinciferous material with a sulfuric acid solution in a cyclic procedure in which spent electrolyte from the zinc electrolysis step is returned to the leaching step and is used as the leach solution. The resulting impure refortified electrolyte is then carefully purified in a plurality of steps and is thereafter passed to the so-called tankhouse for use in the electrolysis step. Certain addition agents may be added to the electrolyte which is subjected to the electrolysis in the tankhouse. The latter is provided with a plurality of electrolytic tanks arranged in banks through which electrolyte flows either in series or parallel. Each tank contains a plurality of suitable insoluble anodes comprised of lead and a plurality of suitable cathodes such as aluminum cathodes; the anodes and cathodes respectively in each tank being connected electrically in parallel while the various tanks are connected in series. Generally, large surface anodes and cathodes, usually in the form of sheets or plates provided with suitable suspending means, are used. Periodically, after a desired amount of zinc has been deposited thereon—for example after about 16 to 24 hours—the bank of cathodes in a tank is removed, the zinc is stripped therefrom and the cathodes are reinserted in the tank. From time to time the anodes are also removed and suitably cleaned, for example by brushing, hosing with water or by drying and rapping the dried anodes, after which the cleaned anodes are reinserted in their respective tanks. New anodes, as such, are used to replace worn-out anodes in an established plant or as the anodes for a new plant.

Generally, the zinciferous material for the leaching step is an oxidic zinciferous material such as a calcined zinc sulfide concentrate or a zinc oxide, usually a de-leaded zinc oxide, obtained by fuming the zinc values from metallurgical slags such as zincy lead blast furnace slags. The first of the purification steps is usually an iron removal step which is followed by one or more galvanic precipitation and filtration steps in which a galvanic precipitant such as zinc dust is added to the electrolyte to precipitate as much as possible of the dissolved metallic contaminants present in the electrolyte. Addition agents such as gum arabic, cresylic acid and sodium silicate, may be added to the electrolyte to control acid spray or mist during the electrolysis and to improve the physical qualities of the cathodic zinc deposit. Also, is accordance with a recent important advance in the art, strontium or barium values, usually as carbonates, may be added to the electrolyte whereby cathodically deposited zinc is produced in which the lead content is drastically lower than would otherwise be obtained in the absence of the use of strontium or barium values.

In the iron removal step of the purification procedure, the dissolved iron in the electrolyte is removed as ferric hydroxide or basic ferric sulfate by partially neutralizing the electrolyte until the iron is precipitated, for example by neutralizing to a pH in the range of about 4.3 to 4.6, and then filtering the resulting precipitate from the electrolyte; the ferrous iron in the electrolyte being oxidized to ferric iron by conducting the leaching and iron precipitation steps in the presence in the electrolyte of a suitable oxidation agent such as air or manganese dioxide. It has been found that when the latter is used as the oxidizing agent to convert the ferrous iron to the ferric state, at least some manganese values, usually in the form of manganese sulfate, remain in the purified electrolyte. It has also been found that when the zinc electrolysis is conducted in the presence of such manganese values in the electrolyte, their presence is of benefit in curbing the lead content of the cathodically deposited zinc.

Although the presence of such manganese values in the electrolyte during the zinc electrolysis is beneficial, it has been discovered that when a new lead-comprising anode or a lead-comprising anode which has been cleaned. as hereinbefore described, after prior use in the zinc electrolysis step, is inserted in the manganese-containing zinc electrolyte, the zinc which is initially deposited on the cathode associated with the anode, and especially when the anode is a new anode, contains a comparatively large amount of lead and that the lead content decreases progressively as the electrolysis is continued until a comparatively low level of lead in the zinc is reached. It has also been discovered that when that portion of the anode which is to be immersed in the zinc electrolyte is coated with a layer of manganese dioxide and the thus coated anode is inserted in the electrolyte, the lead content in the initially deposited zinc on the cathode associated with the coated anode is reduced.

Broadly, the invention, which is based upon the foregoing discoveries, comprehends coating anodes with a coating of manganese dioxide prior to their use in the zinc electrolyte of the electrowinning process which may thereafter be conducted in the usual manner. The invention may be practiced in connection with any of the cleaned, uncleaned or new anodes comprised of lead used in the electrowinning process. It is most beneficial, however, in connection with new or cleaned anodes, and especially with new anodes, which consist, at least in major proportion, of lead—for example the well known silver-lead anode which contains about .75 to 1% silver. In a narrower aspect of the invention, at least the new anodes are provided with the manganese dioxide coating prior to their use in the zinc electrolyte.

One of the principal advantages of the invention is that by its practice the fluctuations, which were heretofore obtained in the lead content of the zinc produced in an electrolytic tank upon the insertion therein of new or cleaned anodes, are reduced or eliminated. Another advantage is that more of the zinc produced in a given plant is of a high or higher grade with respect to lead content than would otherwise be obtained. A further advantage is that where it is desired to conduct the zinc electrowinning process in the presence of manganese in the electrolyte, lower amounts of these values are needed in the operation of the plant without loss of the beneficial effect of the manganese values in the iron removal or the zinc electrodeposition step. These and other objects and advantages will become more apparent from the following more detailed description of the invention.

The manganese dioxide coating may be applied to the anodes in any desired manner to provide an adherent coating—for example by spraying or brushing. However, enhanced results are obtained where the manganese is electrolytically deposited on the anodes. The electrolyte may be a mineral acid electrolyte containing dissolved manganous salts. Preferably, the electrolyte is a sulfuric acid electrolyte containing dissolved manganous sulfate, which, most preferably, is free or substantially free of zinc, perchlorate and permanganate, values. The electrolyte may contain any desired concentration of acid and manganous values and any desired amounts of manganese dioxide may be deposited on the anodes. Likewise, the deposition step may be of any desired duration using any desired electrolyte temperature, current density and with or without agitation or circulation of electrolyte during the deposition.

In another aspect of the invention, the anodes are provided with a hard, adherent, coating of manganese dioxide. For best results, a coating of this type is one which is electrolytically deposited on the anodes from the preferred electrolyte using a low current density which should be below, and advantageously well below, that conventionally used in the electrowinning of zinc, i. e. below about 25 amperes per square foot of immersed anode. Preferably, the electrolyte contains from 1 to 200, and most preferably 30 to 100, grams per liter of sulfuric acid, and from 1 to 25, and most preferably 5 to 25, grams per liter of manganous sulfate; the electrolyte temperature is at a temperature in the range of about 25 to 40° C., and most preferably 30 to 38° C.; and a current density in the range of about .5 to 10 amperes per square foot of immersed anode surface is used. It will be understood that a direct current of suitable voltage is used to supply a sufficient voltage drop between an anode and the cathode associated therewith to obtain the desired current density at the anode.

Under any given set of conditions, the beneficial effect of the present manganese deposit has been found to increase with increasing thickness of the deposit. However, it has also been found that a comparatively small effect is obtained with anodes, particularly coated new anodes, containing less than about 1 gram of manganese dioxide per square foot of anode surface. Likewise, it has been found that coatings in excess of about 15 grams of manganese dioxide per square foot of anode surface are not warranted by the incremental increase of the benefits obtained. Preferably, therefore, the coated anodes contain from 1 to 15, and most preferably from 5 to 15, grams of manganese dioxide per square foot of anode surface.

Any suitable cathode may be used in electrolytically depositing the manganese dioxide coating on the new anodes; however, sheet aluminum cathodes are preferred. The sheet or plate form is also preferred for the anodes. The anodes to be treated and the cathodes are inserted in the manganese electrolyte preferably so as to be disposed therein with a cathode on each side of an anode, with the former spaced about one and one-half inches from the latter. The anodes are immersed in the manganese electrolyte so as to provide a coating of manganese dioxide on at that portion of the anode which will be immersed in the zinc electrolyte during the zinc electrowinning step. When a large number of new anodes is to be treated, they may be inserted into one or more tanks with the anodes and cathodes respectively in each tank connected electrically in parallel, with the tanks connected electrically in series. Preferably, the manganese electrolyte is circulated through each tank. When a bank of such tanks is used, the manganese electrolyte may be circulated therethrough either in series or in parallel.

After the anodes have been coated in the separate coating step they may be inserted at any time thereafter, in either the wet or a dry condition, into the zinc electrolyte, and used therein. In the preferred procedure, the coated anodes are used immediately or within about a week after the coating has been applied, to avoid spalling of the coating. Preferably, the zinc electrolysis is conducted in the presence in the zinc electrolyte of manganese sulfate; the latter being maintained therein preferably in amounts of about 1 to 5 grams per liter calculated as manganese. Preferably, the manganese content of the zinc electrolyte is maintained by controlling the amount of manganese values added to the leach solution during the leach; and where necessary to maintain a desired manganese level in the zinc electrolyte during the electrolysis step, manganous sulfate may be added to the leach solution. The advantage of this procedure is that any deleterious impurities introduced into the electrolyte by the added manganese values are removed in the purification procedure subsequent to the leaching step.

Preferably, the zinc electrolysis step and the rest of the electrowinning procedure are otherwise conducted in the conventional manner set forth earlier herein. Thus, the spent electrolyte which may contain about 50 to 65 grams per liter of dissolved zinc and about 80 to 210 grams per liter of sulfuric acid, may be recycled to the leaching step; and the refortified and purified liquor which may contain about 165 to 200 grams per liter of dissolved zinc and about 5 grams per liter of sulfuric acid, may be returned to the zinc electrolysis step. Conventionally, the latter step is conducted in accordance with either the so-called "cascade" procedure or the "circulating" procedure. In each procedure the tankhouse is provided with a plurality of tanks, each containing a plurality of anodes and cathodes. In the cascade procedure the tanks are connected in series, the refortified electrolyte is fed into the electrolyte in the head tank or tanks and makes a single pass through the tankhouse and the spent liquor is returned to the leach. In the recirculating procedure, the refortified electrolyte is fed into a main body of electrolyte which is recycled in parallel flow through the electrolytic tanks and electrolyte is bled at a suitable rate from the main body for returning to the leaching step. In each procedure the head electrolyte contains about 65 to 75 grams per liter of dissolved zinc and the electrolysis is conventionally conducted at temperatures of 25 to 40° C. or more with current densities of about 27 to 80 amperes per square foot or higher. Under these electrolysis conditions, when manganese sulfate is present in the zinc electrolyte, manganese dioxide tends to be deposited on the anodes and the deposit which is soft and loose in character must periodically be removed from the anodes.

The invention is further illustrated in the accompanying examples. It should be understood, however, that the examples are given for purposes of illustration and the invention in its broader aspects is not limited thereto.

25 new sheet lead anodes of conventional size and shape containing 0.75% silver were placed in a suitable electrolyte tank together with 26 aluminum sheet cathodes so as to be disposed therein with their surfaces parallel to each other and with a cathode on each side of an anode and aligned therewith with the former spaced one and one-half inches from the latter. The anodes and cathodes, respectively, were connected electrically in parallel. The tank contained a manganese sulfate electrolyte containing 24.5 grams per liter of $MnSO_4$ (9.09 grams per liter calculated as Mn) and 30 grams per liter of sulfuric acid. A direct current of sufficient voltage to provide a voltage drop of 2.25 volts between the anodes and cathodes and to impress a current of a density of 0.75 ampere per square foot of immersed anode surface was passed through the electrolyte for a period of 24 hours. The electrolyte temperature was 32–34° C. and the electrolyte was circulated through the tank during the electrolysis. At the end of the 24-hour period the anodes were removed. It was found that the residual electrolyte contained 22.7 grams per liter $MnSO_4$ (8.27 grams per liter calculated as Mn). It was found also that a hard adherent coating of manganese dioxide had been deposited on the anodes in the amount of 6.0 grams of $MnO_2$ (3.82 grams calculated as Mn) per square foot of immersed anode surface.

The thus coated 25 anodes and 25 new uncoated sheet lead anodes containing 0.75% silver were used respectively as the anodes for electrolyzing zinc electrolyte in separate tanks during a four-day test period in a tankhouse of the circulating electrolyte type. Each of said tanks contained 24 conventional sheet aluminum cathodes. The anodes and cathodes were disposed in each tank with their surfaces parallel to each other and in alignment with an anode on each side of a cathode and with each cathode spaced one and one-half inches from each adjacent anode.

The zinc electrolyte was prepared by leaching calcined zinc sulfide concentrates with spent zinc electrolyte from the tankhouse. The ferrous iron that was dissolved during the leaching was oxidized to ferric iron by adding manganese dioxide at the beginning of the leaching step. Manganese sulfate as required was also added during the leach to maintain a desired level within the range of 1 to 5 grams per liter of Mn in the electrolyte during the electrolysis. The ferric iron was precipitated by conducting the leaching until the pH of the refortified electrolyte was increased to about 4.3 to 4.6. Thereafter the precipitated iron was removed by filtering and the filtrate was further purified in two galvanic precipitation steps in which a galvanic precipitant comprising zinc dust was used and the resulting precipitate of impurities was removed by filtration.

The refortified and purified electrolyte which was distinctly acid to methyl orange and contained about 165 to 200 grams per liter of dissolved zinc, was introduced into the main body of circulating electrolyte at a rate sufficient to maintain a desired level of dissolved zinc in the recirculated electrolyte passing to the head of the electrolytic tanks of the tankhouse through which tanks the electrolyte flowed in parallel. To the recirculating electrolyte there was added 0.49 pound of gum arabic, 0.31 pound of cresylic acid and 2.5 pounds of strontium carbonate—all per ton of cathodic zinc produced in the tankhouse.

The current density used during the test period was 76.19 amperes per square foot, the voltage drop was 3.2 to 3.5 volts, the electrolyte temperature was 36° to 38° C. The electrolyte entering and leaving the test tanks was analyzed every two hours. The zinc deposited on the cathode was stripped therefrom every 16 hours. The electrolyte entering the tanks had an average specific gravity of 1.305, and contained 191 grams per liter of sulfuric acid, 73.1 grams per liter of dissolved zinc, and 1.55 grams per liter Mn. The electrolyte leaving the test tank with the coated anodes had an average specific gravity of 1.299 and contained 200 grams per liter of sulfuric acid, 69.4 grams per liter of dissolved zinc, and 1.15 grams per liter of Mn. The electrolyte leaving the test tank with the uncoated anodes had an average specific gravity of 1.298 and contained 201 grams per liter of sulfuric acid, 68.6 grams per liter of dissolved zinc and 1.02 grams per liter of Mn. The average lead content of the zinc stripped from the cathodes from each of the test tanks at the end of the 16-hour periods indicated in Table I and the manganese content of the electrolyte leaving the tanks at the end of the particular 16-hour period are set forth in the table.

Table 1

| Strip Period | Uncoated Anodes | | Coated Anodes | |
|---|---|---|---|---|
| | Grs./l. Mn | Percent Pb | Grs./l. Mn | Percent Pb |
| 1 | 1.13 | .0035 | 1.19 | .0026 |
| 2 | 1.04 | .0026 | 1.16 | .0024 |
| 4 | 1.01 | .0025 | 1.16 | .0025 |

It will be noted that all of the zinc produced in the tank containing the coated anodes had a lead content well below .003%. However, in the tank containing the uncoated anodes, the zinc produced at least during the first 16-hour period contained 35% more lead than that produced in the tank with the coated anodes. Also, the zinc produced during the first 16-hour period in the tank with the uncoated anodes contained .0035% lead—an amount which is well above the .003% lead content which is the maximum that the industry will now accept in special high grade zinc.

It will be noted further that the manganese depletion in the tank with the uncoated anodes was appreciably higher than in the tank with the coated anodes. In this connection in practicing the invention in the tankhouse over a period of several months, it was found that, when the new anodes which were inserted in the various tanks from time to time were coated as described herein prior to their use, a total of about 18 pounds of manganese values (calculated as Mn) per ton of produced zinc were required to be added to the leach to maintain a desired level of manganese in the electrolyte during the electrolysis. However, in a similar period prior thereto in which the new anodes that were inserted were not provided with the present coating, a total of about 50 pounds of manganese values (calculated as Mn) were required to maintain the manganese level in the electrolyte. Thus, the practice of the invention reduced the manganese consumption by two-thirds. In addition, during the period when the invention was practiced, much less manganese dioxide was precipitated on the walls and bottom of the electrolyte tanks and in the various conduits, storage tanks, etc. of the tankhouse, which resulted in a considerable saving in labor due to the reduction in the amount of cleaning that was required.

It will be understood that any one or more or all of the new, cleaned or uncleaned anodes may be coated in accordance with the invention prior to their insertion and use in the zinc electrodeposition step of the zinc electrowinning process. However, in any given plant, the greatest increment in benefit with respect to the lead content of the produced zinc is obtained by coating the new anodes. A lesser benefit is obtained in coating cleaned or uncleaned anodes. Preferably, therefore, at least the new anodes, and at least a major proportion and most preferably all or substantially all of the number of the new anodes required for the plant, are treated in accordance with the invention. Where a further benefit as to the lead content of the zinc is desired, a major proportion, all or substantially all of the cleaned or uncleaned anodes, or both of these types, may be treated in accordance with the invention although where such further benefit is sought it is preferred to coat the cleaned anodes. It will also be understood that the invention may be practiced by coating the cleaned or uncleaned anodes, or both of these types, without coating the new anodes.

What is claimed is:

1. In a process for electrowinning zinc by electrodepositing zinc from a zinc electrolyte, the major nonaqueous constituents of said electrolyte being substantial quantities of sulfuric acid and zinc sulfate, and which involves the use of insoluble anodes comprised of lead, the improvement which comprises coating anodes for the process with a coating of manganese dioxide prior to their use in the zinc electrodeposition step, said coating being a layer of manganese dioxide applied at least on that portion of the anode surface which is to be immersed in said electrolyte during said zinc electrodeposition step.

2. A process according to claim 1 in which said manganese dioxide coating is electrolytically deposited on said anodes.

3. A process according to claim 2 in which anodes before their initial use in said zinc electrolyte are coated with said coating of manganese dioxide in amounts from 1 to 15 grams of manganese dioxide per square foot of immersed surface.

4. A process according to claim 2 in which said anodes are comprised of a major proportion of lead and contain 0.75 to 1% silver, the new anodes and anodes which have been cleaned after prior use in the zinc deposition step are coated with a hard adherent coating of manganese dioxide in amounts from 5 to 15 grams of manganese dioxide per square foot of the anode surface to be immersed in said zinc electrolyte, and the zinc electrolyte contains 1 to 5 grams per liter of manganese sulfate calculated as manganese during said zinc electrodeposition step.

References Cited in the file of this patent

UNITED STATES PATENTS

| | | |
|---|---|---|
| 1,167,700 | Laist et al. | Jan. 11, 1916 |
| 2,754,174 | Roberts | July 10, 1956 |
| 2,772,230 | Hollander et al. | Nov. 27, 1956 |

OTHER REFERENCES

Eng. Mining Journal, vol. 126, pp. 856–860 (1928), article by Tainton.